United States Patent [19]

Kurakake

[11] 4,396,975

[45] Aug. 2, 1983

[54] POSITION CONTROL SYSTEM FOR A CLOSED LOOP TYPE NUMERICAL-CONTROLLED MACHINE TOOL

[75] Inventor: Mitsuo Kurakake, Hino, Japan

[73] Assignee: Fujitsu Fanuc Limited, Tokyo, Japan

[21] Appl. No.: 192,802

[22] Filed: Oct. 1, 1980

[51] Int. Cl.³ .............................................. G05B 11/42
[52] U.S. Cl. .................................... 364/161; 364/174;
364/176; 364/183; 364/474; 364/609
[58] Field of Search ............... 364/161, 166, 174, 176,
364/177, 183, 474, 475; 318/609, 611, 621, 622,
632, 561

[56] References Cited

U.S. PATENT DOCUMENTS

| | | | |
|---|---|---|---|
| 3,644,719 | 2/1972 | Rouxel et al. ..................... | 364/177 |
| 3,790,764 | 2/1974 | Rouxel et al. ..................... | 364/177 |
| 3,838,257 | 9/1974 | Ross ................................. | 364/161 X |
| 3,864,554 | 2/1975 | Chevalier et al. ................. | 364/161 |
| 3,901,466 | 8/1975 | Lambrects ....................... | 364/176 X |
| 3,968,352 | 7/1976 | Andeen ............................ | 364/176 X |
| 3,979,682 | 9/1976 | Warwick .......................... | 364/176 X |

Primary Examiner—Joseph F. Ruggiero
Attorney, Agent, or Firm—Staas & Halsey

[57] ABSTRACT

A position control system for a closed loop type numerical-controlled machine tool in which detected position information is fed back to the input side from a movable machine part or a motor driving it. In the closed loop there are provided an integrating element and a device for compensating for unstableness of the closed loop caused by the integrating element. The integrating element and the compensating device serve to improve the position deviation characteristic of the closed loop, thereby permitting accurate position control.

9 Claims, 9 Drawing Figures

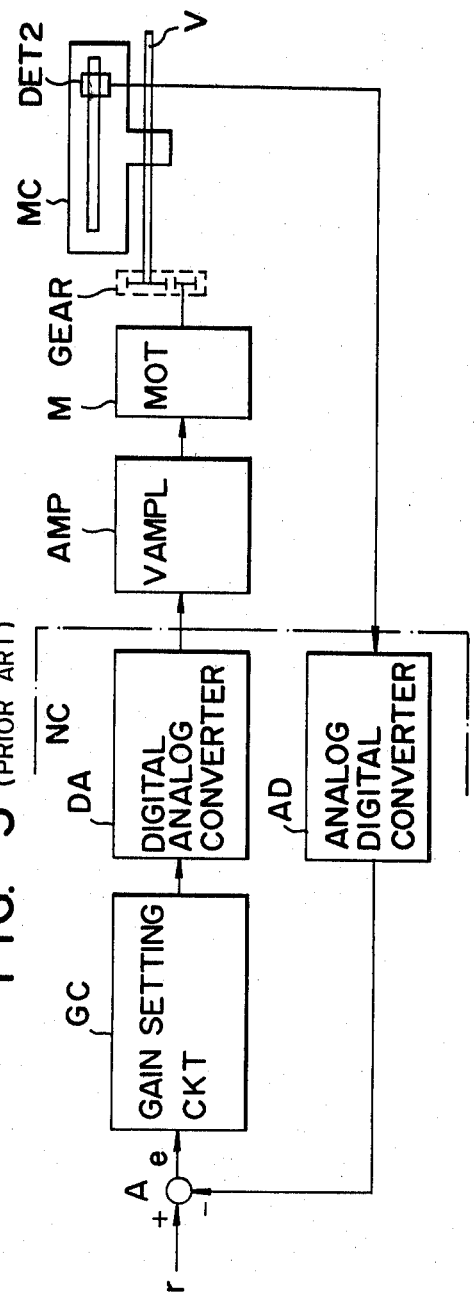
FIG. 5 (PRIOR ART)
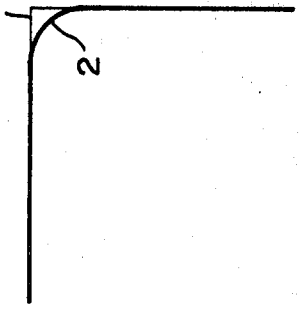
FIG. 4
FIG. 3

POSITION CONTROL SYSTEM FOR A CLOSED LOOP TYPE NUMERICAL-CONTROLLED MACHINE TOOL

BACKGROUND OF THE INVENTION

1. Field of the Invention

The present invention relates to a position control system which permits accurate position control of a numerical-controlled machine tool.

2. Description of the Prior Art

A position control system that has heretofore been proposed for numerical-controlled machine tools, as shown in FIG. 1, employs a semi-closed loop type servomechanism. With this conventional system, for example, the rotational angle of a motor shaft is detected by a position detector DET1, such as a resolver or the like, and the detected position information x is negatively fed back to a position control section NC of a numerical control unit, wherein it is provided via an A-D converter AD to an adder A. In the adder A, a difference is detected between position information x and commanded position information r to obtain a position deviation e. The position deviation e is applied via a gain setting circuit GC and a D-A converter DA to a velocity amplifier AMP, by which a motor M is driven in such a manner as to reduce the position deviation e to zero, and the motor rotating a reduction gear GEAR and a ball screw V controlling the position of a moving table MC. FIG. 2 shows an example of a block diagram corresponding to FIG. 1. In FIG. 2, reference character K indicates the gain of the gain setting circuit GC; $G_1(s)$ designates the transfer function of a velocity control section composed of the velocity amplifier AMP; $G_2(s)$ identifies the transfer function of the motor shaft M; and $\omega_v$ denotes the break point angular frequency of the transfer function of the velocity control section. As is evident from FIG. 2, since the mechanical system is placed outside the closed loop system, the semi-closed loop type servomechanism allows easy maintenance of the closed loop system stability, and accordingly it is adopted in various machine tools. A discussion follows of the movement x of the motor shaft in the case where the ramp input specified in equation (1) is applied as the commanded position information r to a numerical-controlled machine tool.

$$r = F \times t \qquad (1)$$

where F is a feed rate and t is time. The transfer function G(s) of the abovesaid closed loop is given as follows:

$$G(s) = \frac{\frac{K}{S\left(1 + \frac{s}{\omega_V}\right)}}{1 + \frac{K}{S\left(1 + \frac{s}{\omega_V}\right)}} = \frac{K}{\frac{s^2}{\omega_V} + S + K} \qquad (2)$$

Letting the Laplace transformation of the input r be represented by R(s), a deviation E(s) on its desired value R(s) becomes as follows:

$$E(s) = \frac{1}{1 + G(s)} \times R(s) = \frac{\frac{s^2}{\omega_V} + s}{\frac{s^2}{\omega_V} + s + K} \times \frac{F}{s^2} \qquad (3)$$

Accordingly, the steady-state deviation $e(t \to \infty)$ becomes as follows:

$$e(t \to \infty) = \lim_{s \to 0} s \cdot E(s) = \frac{F}{K} \qquad (4)$$

The movement of the motor shaft, and accordingly the movement of the moving table MC, in its steady-state, has a certain amount of time lag which is proportional to the feed rate and inversely proportional to the gain K. This delay has a direct influence on the actual cutting accuracy. For example, when cutting a workpiece by straight cutting into the configuration indicated by reference numeral 1 of FIG. 3, the actual locus of movement of a tool causes a cut as indicated by reference numeral 2; namely, the corner of the work is rounded in proportion to the delay. When making a circular cut, the locus of movement 2 of the tool deviates from a true circle 3, as illustrated in FIG. 4. When the tool is suddenly stopped while running at a constant speed, the actual tool movement overruns by the delay. Consequently, the overrun poses a problem when stopping the cutting operation by stepping on a stroke switch of the machine tool. As is apparent from equation (4), an increase in the gain K decreases the delay, however, there is an upper limit to the magnitude of the gain K which can be used and still remain in a stable region and it is difficult to correct the delay in that upper range.

Various problem resulting from such steady-state deviation are encountered not only in the aforesaid semi-closed loop type numerical-controlled machine tool but also in a closed loop type numerical-controlled machine tool such, for example, as shown in FIG. 5. In the closed loop type a position detector DET2, such as an inductive detector or the like, is mounted on a moving part of the machine tool to be ultimately controlled, for example, the moving table. The detected position information is negatively fed back so that it may coincide with the commanded position information r. Accordingly, it has been desired to solve the above outlined problems.

SUMMARY OF THE INVENTION

It is an object of the present invention to provide a position control system for numerical-controlled machine tools which permits highly accurate position control.

Another object of the present invention is to provide a position control system for closed-loop type numerical-controlled machine tools in which the closed loop is stabilized by a compensator using the operating function of a processor to facilitate the adjustment.

Yet another object of the present invention is to provide a simple method for stabilizing the closed loop without using the operating function of a processor.

Briefly stated, according to the present invention, in a closed loop type numerical-controlled machine tool the detected position information from a movable machine part or a motor driving it is fed back to the input. Provided in the closed loop is an integrating element and a device means for compensating for the instability of the closed loop caused by the integrating element, by which the closed loop is stabilized and the position deviation characteristic of the closed loop is improved allowing highly accurate position control. The abovesaid compensating device is a compensator using the operating function of a processor which contains characteristics of the closed loop including the integrating element, or a proportional element connected in parallel with the integrating element, the constant of the proportional element is adjusted together with the constant of the integrating element so that the closed loop is stable.

BRIEF DESCRIPTION OF THE DRAWINGS

FIGS. 3 and 4 are graphs illustrating the influence of a steady-state deviation on cutting accuracy;

FIG. 5 is a system diagram of a conventional closed loop type numerical-controlled machine tool;

DESCRIPTION OF THE PREFERRED EMBODIMENTS

Figure 1:
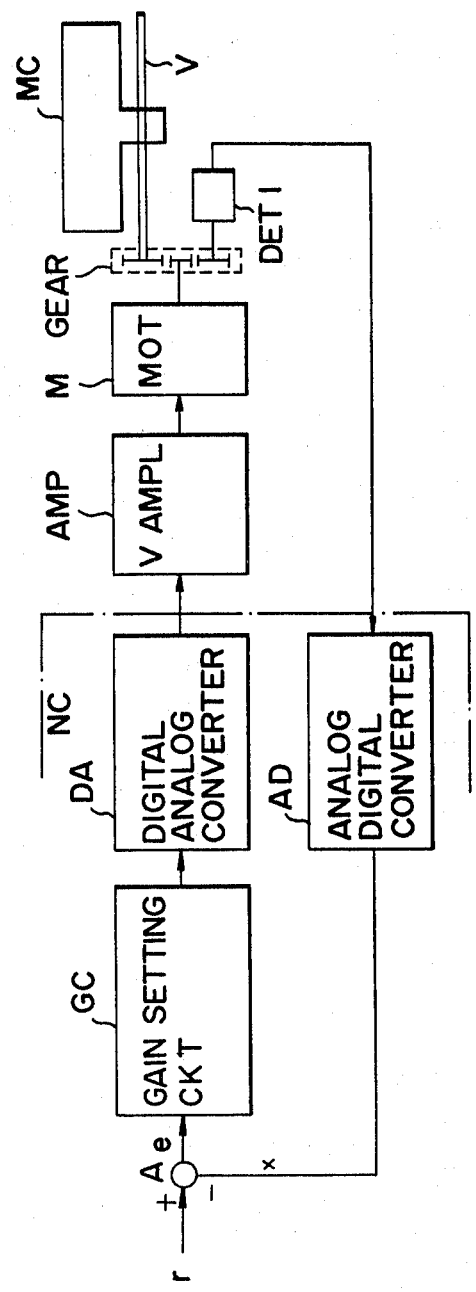
FIG. 1 is a block diagram of a conventional semi-closed loop type numerical-controlled machine tool.
Figure 2:
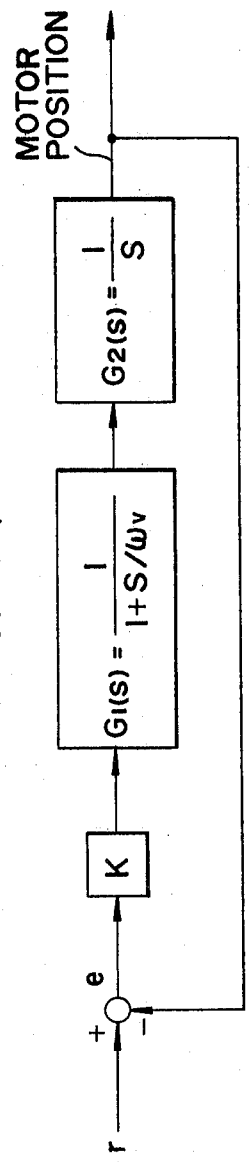
FIG. 2 is a block diagram of the machine tool shown in FIG. 1.
Figure 6:
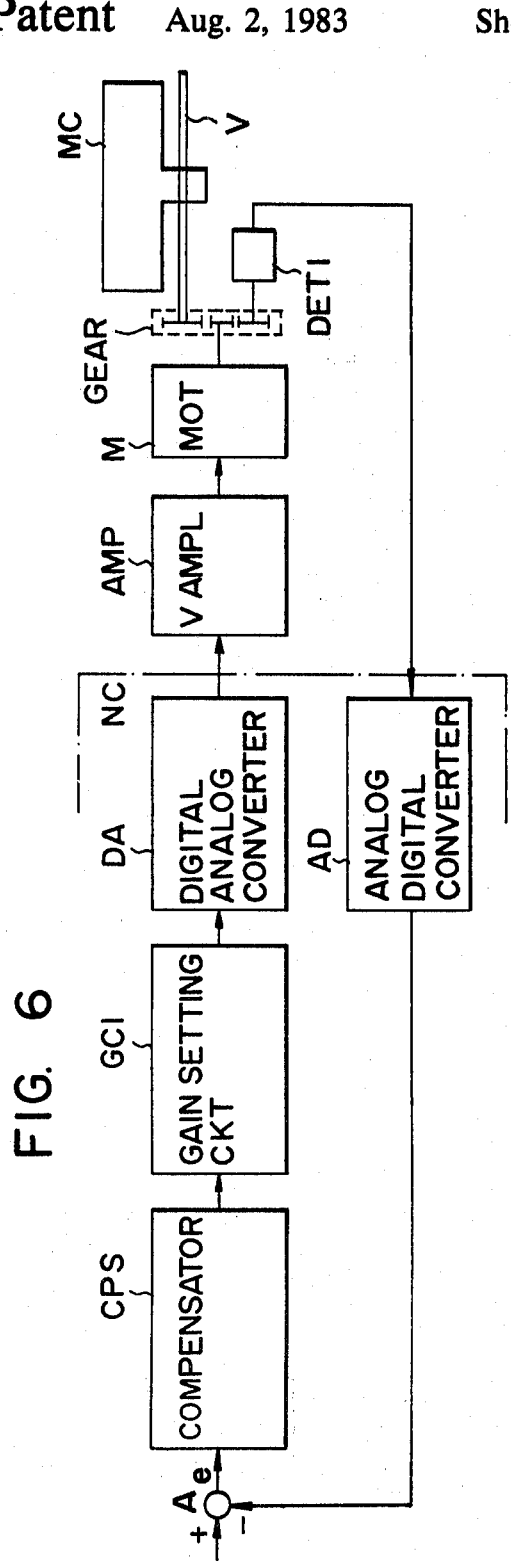
FIG. 6 is a block diagram illustrating an example of a numerical-controlled machine tool embodying the position control system of the present invention.
Figure 7:
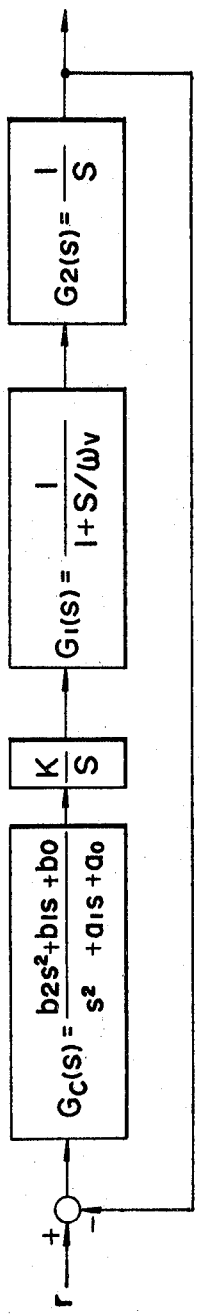
FIG. 7 is a block diagram of the machine tool shown in FIG. 6.

FIG. 6 illustrates the construction of an example of a numerical-controlled machine tool embodying the position control system of the present invention. In FIG. 6, parts corresponding to those in FIG. 1 are identified by the same reference characters. Reference character CPS indicates a compensator; and GC1 designates a gain setting circuit. FIG. 7 shows in block form the position control system utilized in FIG. 6. In FIG. 7, reference characters $G_1(s)$ and $G_2(s)$ identify the transfer functions of the velocity control section and the motor; and K/s denotes the transfer function of the gain setting circuit GC1.

Figure 8:
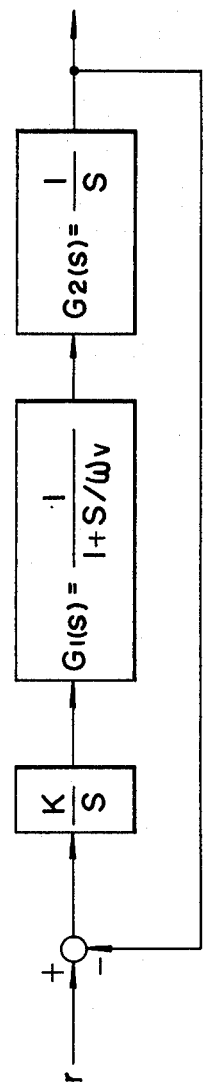
FIG. 8 is a block diagram showing the effect produced by the present invention.

According to this embodiment, in the semi-closed type numerical-controlled machine tool, the gain setting circuit is a proportional element and an integrating element while in the prior art the gain setting circuit an integrating element alone. In this embodiment the compensator CPS is inserted in the closed loop to stabilize it. Setting the following equation:

$$G_p(s) = (K/s) \times G_1(s) \times G_2(s) \quad (5)$$

and considering such a closed loop as shown in FIG. 8 in which the compensator CPS is not included, the steady-state deviation e (t→∞) relative to the ramp input r becomes $$e(t \to \infty) = \lim_{s \to 0} s \cdot E(s) = 0 \quad (6)$$

from $$E(s) = \frac{1}{1 + G_p(s)} \times R(s) = \frac{\frac{s^3}{\omega V} + s^2}{\frac{s^3}{\omega V} + s^2 + K} \times \frac{F}{s^2} \quad (7)$$

That is, when the gain setting circuit GC1 is equipped with an integrating characteristic, the steady-state deviation e is zero. With such an arrangement, however, the closed loop is unstable since the characteristic equation of the closed loop is as follows:

$$(s^3/\omega V) + s^2 + K = 0 \quad (8)$$

In the present embodiment, the compensator CPS inserted in the stage preceding the gain setting circuit GC1 is to stabilize the closed loop which is made unstable by the gain setting circuit GC1 having the integrating characteristic. A description will be given of the construction of the compensator CPS.

Generally, it is known, as in the J. B. Pearson's dynamic compensator, that when a compensator having a transfer function of second degree Gc(s) is provided at a stage preceding a transfer function of third degree Gp(s), the characteristic root of the closed loop transfer function Gc(s) Gp(s) of a compensated system can be designated arbitrarily. Then, introducing the transfer function of second degree Gc(s) as follows:

$$G_c(s) = \frac{b_2 s^2 + b_1 s + b_0}{s^2 + a_1 s + a_0} \quad (9)$$

the compensated system has a transfer function of fifth degree. If the characteristic root is determined in such a manner as to stabilize the closed loop and in consideration of its rapid response, then the characteristic equation of the closed loop is given by the following equation, using the determined characteristic root $-r_0$ to $-r_4$:

$$1 + G_c(s) \times G_p(s) = (s+r_0)(s+r_1)(s+r_2)(s+r_3)(s+r_4) \quad (10)$$

Since coefficients $a_0$, $a_1$, $b_0$, $b_1$ and $b_2$ of the transfer function Gc(s) in the equation (8) are determined by a simple algebraic equation from the above equation, the transfer function Gc(s) of the compensator CPS is determined completely.

Once the coefficients of the compensator CPS have thus been determined, the compensator CPS can be realized, using the operating function of a processor in the manner described below. Transforming the equation (9), it becomes as follows:

$$G_c(s) = b_2 + \frac{(b_1 - b_2 a_1)s + (b_0 - b_2 a_0)}{s^2 + a_1 s + a_0} \quad (11)$$

In general, the status equation of minimal degree of a system having such a transfer function Gc(s) is expressed by a differential equation such, for example, as follows:

$$\begin{cases} \dot{x} = \begin{bmatrix} 0 & 1 \\ -a_0 & -a_1 \end{bmatrix} x + \begin{bmatrix} 0 \\ 1 \end{bmatrix} u \\ y = \begin{bmatrix} b_0 - b_2 a_0 \\ b_1 - b_2 a_1 \end{bmatrix} x + b_2 u \end{cases} \quad (12)$$

where $\dot{x}=(d/dt)x$, u is an input, y is an output and x is expressed by $$x = \begin{bmatrix} x_1 \\ x_2 \end{bmatrix}$$

where $x_1$ and $x_2$ are status variables. Since the equation (12) is a continuous system, it is transformed into the following difference equation in the actual processing by the processor:

$$\begin{cases} x(k+1) = \phi(T) \cdot x(k) + h(T)u(k) \\ y(k+1) = \begin{bmatrix} b_0 - b_2 a_0 \\ b_1 - b_2 a_1 \end{bmatrix} \cdot x(k+1) + b_2 u(k+1) \end{cases} \quad (13)$$

where $\phi(T)$ and $h(T)$ are functions including $a_0$, $a_1$, $b_0$, $b_1$ and $b_2$. The compensator CPS is realized by performing this operation on an online basis by the processor simultaneously with the cutting control.

As described above, according to the present embodiment, in the semi-closed loop type numerical controlled machine tool, the gain setting circuit GC1 is equipped with the integrating characteristic alone and the compensator CPS, which is constructed by using the operating function of a processor, is provided at the stage proceeding the gain setting circuit GC1 for stabilizing the closed loop. Since the steady-state deviation e can be removed without making the closed loop unstable, highly accurate position control can be achieved. Further, since the adjustment for stabilizing the closed loop is carried out by the processor, this embodiment has an advantage that no cumbersome adjustment is involved unlike an embodiment described later.

The position where the integrating element is inserted may be a position where the integrating element will appear in the total transfer function. For example, it may also be inserted in the velocity control section, but since the velocity control section is usually produced as one unit and sold together with a machine tool, it is difficult in practice to insert the integrating element in the velocity control section and, further, since the arrangement of the velocity control section differs from machine to machine, this poses a problem in that the method of realizing the integrating element differs with individual arrangements of the velocity control section. That is the reason the integrating element is provided in the gain setting circuit in the present embodiment. By providing the integrating element on the input side of the position control section NC which precedes the stage of the velocity control section, one numerical control unit can easily be used with various machine tools and, in additon, the compensator CPS, including the integrating element, can be realized by the operating function of a processor. The foregoing description has been given of the case where the compensator CPS is designed on the basis of the idea of the J. B. Pearson's dynamic compensator, but a similar compensator can be designed, using known output regulator theories.

Figure 9:
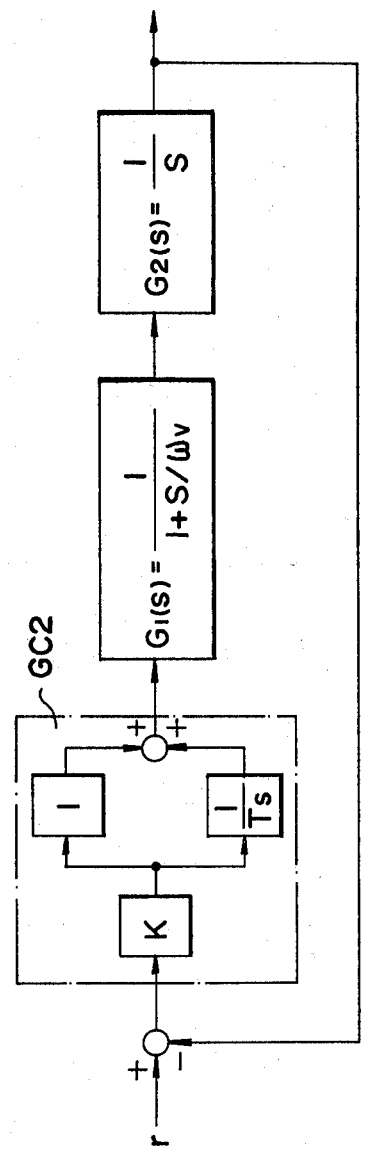
FIG. 9 is a block diagram of another example of the numerical-controlled machine tool embodying the present invention.

The foregoing embodiment shows an example of the arrangement of the control system based on current control theory introducing status variables, but the object of the present invention can also be attained by a system based on classical control theory. FIG. 9 illustrates in block form a semi-closed loop type numerical controlled machine tool embodying that system. In FIG. 9, reference character GC2 indicates a gain setting circuit; and $G_1(s)$ and $G_2(s)$ designate the transfer functions of the velocity control section and the motor.

In this embodiment, an integrating element is provided in the gain setting circuit GC2 for the position deviation, and a proportional element is connected in parallel with the integrating element. The stabilization of the closed loop is achieved by adjusting constants K and T of the proportional element and the integrating element.

In the case of applying the ramp input r to the control system in FIG. 9, the steady-state deviation e $(t \to \infty)$ becomes as follows:

$$e(t \to \infty) = \lim_{s \to 0} s \cdot E(s) = 0 \quad (14)$$

from $$E(s) = \frac{1}{1+G_3(s)} \times R(s) = \frac{s^2 + \frac{s^3}{\omega_V}}{s^2 + \frac{s^3}{\omega_V} + Ks + \frac{1}{T}} \times \frac{F}{s^2} \quad (15)$$

where $G_3(s)$ is the total transfer function of the gain setting circuit GC2, the velocity control section and the motor. Accordingly, no delay is caused by the steady-state deviation. Since the characteristic equation of the closed loop in this case becomes as follows:

$$(s^3/\omega_V) + s^2 + Ks + (1/T) = 0 \quad (16)$$

it is possible to stabilize the closed loop and obtain a desired response characteristic by adjusting the constants K and T within the range of $K > 1/T\omega_V$ so that the response characterisic of the closed loop may become a desirable one. The present embodiment does not necessitate the use of a processor unlike the foregoing embodiment, and hence is advantageous in that the system is simple in arrangement and easy to realize. It is also possible to adopt such an arrangement in which the aforesaid dynamic compensator is provided in the stage preceding the stage of the gain setting circuit GC2 in the present embodiment, and in such a case, the adjustment of the constants K and T can be omitted.

In the foregoing embodiments, the present invention is applied to the semi-closed loop type numerical-controlled machine tool in which the position information is fed back from the motor shaft, but it is a obvious of course that the invention is also applicable to the closed loop type numerical-controlled machine tool in which the position information is fed back directly from a movable machine part.

As has been described in the foregoing, according to the present invention, in the closed loop type numerical-controlled machine tool, an integrating element is inserted in the closed loop at a proper place and a device is provided for compensating for unstableness of the closed loop which is caused by inserting the integrating element. Since the steady-state deviation can be eliminated without making the closed loop unstable, highly accurate position control can be achieved.

It will be apparent that many modifications and variations may be effected without departing from the scope of the novel concepts of this invention.

What is claimed is:

1. A position control system, having a signal path, for a closed loop type numerica. controlled machine tool in which detected position information is fed back through a feedback path to an input side from a movable machine part or a motor driving it, said position control system comprising:
   an integrating element operatively connected in the signal path of the closed loop;
   means, operatively connected in the signal path of the closed loop to receive an error signal, for compensating for unstableness of the closed loop caused by the effect of said integrating element on the error signal; and
   a position control section and a velocity control section after the position control section both operatively connected in the signal path; and
   wherein said integrating element is provided in the position control section which precedes the velocity control section, said integrating element generates an integrated output and said velocity control section receives said integrated output, and position control of the movable machine part is performed, improving a position deviation characteristic of the closed loop by said compensating means and said integrating element.

2. A position control system according to claim 1, wherein said compensating means comprises a processor.

3. A position control system according to claim 1, wherein said compensating means is a dynamic compensator having a transfer function of second degree.

4. A position control system according to claim 1, wherein said integrating element and said compensating means both comprise a processor.

5. A position control system according to claim 1, wherein said compensating means is a proportional element operatively connected in parallel with said integrating element, wherein said parallel connection is operatively connected in the closed loop, and wherein a constant of said proportional element is adjusted together with a constant of said integrating element, so that the closed loop is stabilized.

6. A position control system for a numerical-controlled machine tool operatively connectable to receive a commanded position signal, comprising:
   an adder, having a commanded position input receiving the commanded position signal and having an actual position signal input, for generating an error signal;
   a compensator, operatively connected to said adder, for generating a compensated error signal;
   a gainsetting circuit, operatively connected to said compensator, for generating an amplified error signal in dependence upon the compensated error signal;
   a velocity control section, operatively connected to said gainsetting circuit, for generating a velocity control signal in dependence upon the amplified error signal;
   a motor, operatively connected to said velocity control section, turning in dependence upon the velocity control signal; and
   a detector, coupled to said motor and operatively connected to the actual position input of said adder, for generating an actual position signal;
   wherein the error signal generated by said adder is the difference between the commanded position signal and the actual position signal.

7. A position control system according to claim 6, wherein said compensator has a transfer function in the Laplacian domain defined by $$\frac{b_2 S^2 + b_1 S + b_0}{S^2 + a_1 S + a_0},$$

wherein said gainsetting circuit has a transfer function in the Laplacian domain defined by $$K/S,$$

wherein said velocity control section has a transfer function in the Laplacian domain defined by $$1/(1+S/\omega_v),$$

and wherein said motor as a transfer function in the Laplacian domain defined by $$1/S,$$

where K equals gain, $\omega_v$ equals a break point angular frequency of said velocity control section, S represents a time function in the Laplacian domain and $b_2, b_1, b_0, a_1$ and $a_0$ are constants.

8. A position control system according to claim 7, wherein said amplified error signal comprises an analog amplified error signal and a digital amplified error signal;
   wherein said actual position signal comprises an analog actual position signal and a digital actual position signal;
   wherein said error signal, said compensated error signal and said commanded position signal are digital signals;
   wherein said position control system further comprises:
   a digital-to-analog converter, operatively connected between said gainsetting circuit and said velocity control section, for converting the digital amplified error signal into the analog amplified error signal; and
   an analog-to-digital converter, operatively connected between said detector and said adder, for converting the analog actual position signal into the digital actual position signal.

9. A position control system for a numerical-controlled machine tool operatively connectable to receive a commanded position signal, said position control system comprising:
   an adder, having a commanded position input receiving the commanded position signal and having an actual position input, for generating an error signal;
   a compensator, operatively connected to said adder, for generating a compensated error signal;
   a gainsetting circuit, operatively connected to said adder, for generating an amplified error signal in dependence upon the error signal, said gainsetting circuit comprising:
- a proportional unit operatively connected to said adder, having a transfer function in the Laplacian domain of K;
- a unit section, operatively connected to said proportional unit, having a unitary transfer function;
- an integrating unit, operatively connected to said proportional unit, having a transfer function in the Laplacian domain of $1/t$; and
- a summing circuit, operatively connected to said unit section and said integrating unit for generating the amplified error signal;

a velocity control section, operatively connected to said summing circuit having a transfer function in the Laplacin domain defined by $$1/(1+S/\omega_v),$$

for generating a velocity control signal in dependence upon the amplified error signal;

a motor, operatively connected to said velocity control section and having a transfer function in the Laplacian domain defined by $1/S$, for turning in dependence upon the velocity control signal; and a detector, operatively coupled to said motor and operatively connected to the actual position input of said adder, for generating an actual position signal;

where K equals gain, t is an adjusting constant, $\omega_v$ is a break point angular frequency of said velocity control section, S represents a time function in the Laplacian domain and the error signal generated by said adder is the difference between the commanded position signal and the actual position signal.

* * * * *

UNITED STATES PATENT AND TRADEMARK OFFICE
CERTIFICATE OF CORRECTION

PATENT NO. : 4,396,975
DATED     : August 2, 1983
INVENTOR(S) : Kurakake

It is certified that error appears in the above-identified patent and that said Letters Patent is hereby corrected as shown below:

Front page [56] References
        Col. 2, line 3, "Lambrects" should be --Lambregts--.

Column 1, line 39, "$W_v$" should be --$W_V$--.

line 46, "delete "of" (first occurrence).

Column 2, line 68, delete "means".

Column 3, line 53, after "circuit" insert --is--.

Col. 5, line 32, "numerical controlled" should be
        --numerical-controlled--.

Col. 6, line 58, delete "a".

Column 7, line 9, numerical controlled should be
        --numerical-controlled--.

Signed and Sealed this

Twenty-first Day of February 1984

[SEAL]

Attest:

GERALD J. MOSSINGHOFF

Attesting Officer     Commissioner of Patents and Trademarks